(12) United States Patent
Patel

(10) Patent No.: US 10,164,877 B2
(45) Date of Patent: *Dec. 25, 2018

(54) VIDEO ROUTER

(71) Applicant: Evertz Microsystems Ltd., Burlington (CA)

(72) Inventor: Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,099

(22) Filed: Mar. 2, 2018

(65) Prior Publication Data

US 2018/0191608 A1 Jul. 5, 2018

Related U.S. Application Data

(63) Continuation of application No. 15/484,852, filed on Apr. 11, 2017, now Pat. No. 9,942,139, which is a
(Continued)

(51) Int. Cl.
*H04L 12/773* (2013.01)
*H04L 12/933* (2013.01)
*H04L 12/931* (2013.01)

(52) U.S. Cl.
CPC ............ *H04L 45/60* (2013.01); *H04L 49/101* (2013.01); *H04L 49/206* (2013.01)

(58) Field of Classification Search
CPC ...... H04L 45/60; H04L 49/101; H04L 49/206
See application file for complete search history.

(56) References Cited

U.S. PATENT DOCUMENTS 6,976,134 B1 12/2005 Lolayekar et al.
7,194,550 B1 * 3/2007 Chamdani ........... H04L 67/1097
709/227

(Continued)

FOREIGN PATENT DOCUMENTS

CA 2866073 A1 4/2015

*Primary Examiner* — Ayaz R Sheikh
*Assistant Examiner* — Debebe A Asefa
(74) *Attorney, Agent, or Firm* — Bereskin & Parr LLP/S.E.N.C.R.L., s.r.l.

(57) ABSTRACT

The embodiments described herein provide a data transmission system comprising a plurality of video routers, a supervisory system for transmitting one or more router configuration signals to one or more video routers, and a control communication network for coupling the plurality of video routers and the supervisory system. Each router in the system comprises a backplane including a plurality of backplane connections, at least one line card and at least one fabric card. Each line card comprises a plurality of input ports and output ports where each input and output port is coupled to a respective external signal through the backplane. Each line card further comprises a line card crosspoint switch having a plurality of input switch terminals and a plurality of output switch terminals. Each fabric card comprises a fabric card cross-point switch having a plurality of input switch terminal and a plurality of output switch terminals. Furthermore, each line card and each fabric card comprises a card controller where the card controller selectively couples one or more input switch terminals of a cross-point switch to the output switch terminals of that cross-point switch. The cross-point switches being manipulated by the card controller may belong to one or more different cards within the same video router.

20 Claims, 7 Drawing Sheets

Related U.S. Application Data continuation of application No. 14/505,124, filed on Oct. 2, 2014, now Pat. No. 9,654,391.

(60) Provisional application No. 61/885,588, filed on Oct. 2, 2013.

(56) References Cited

U.S. PATENT DOCUMENTS

| | | | |
|---|---|---|---|
| 8,776,161 B2 * | 7/2014 | Gazier | H04N 21/222 375/240.07 |
| 8,891,406 B1 | 11/2014 | Shekhar | |
| 9,654,391 B2 | 5/2017 | Patel | |
| 2017/0279711 A1 | 9/2017 | Patel | |

* cited by examiner

VIDEO ROUTER

CROSS-REFERENCE TO RELATED APPLICATIONS

This application is a continuation of U.S. patent application Ser. No. 15/484,852, filed on Apr. 11, 2017, which is a continuation of U.S. patent application Ser. No. 14/505,124, filed on Oct. 2, 2014, (now issued as U.S. Pat. No. 9,654,391), which claims the benefit of U.S. Provisional Patent Application No. 61/885,588, filed Oct. 2, 2013. The entire contents of the applications are hereby incorporated by reference.

FIELD

The described embodiments relate to routers for video signals and other data streams.

BACKGROUND

The number of devices coupled to data communications networks is increasing rapidly. The routing of data streams from and to such devices is increasingly more complex and difficulty in allocating efficient routes, or even any route at all, in various components in a communication network can affect the quality of service delivery to a user of a device. For example, communication networks typically contain routers that couple an input data stream received at an input port to an output port at which the data stream is available to a downstream device. As the size of routers increases (i.e. as the number of input and output ports on a router increases, then complexity of creating efficient routing within the router and between network devices increase non-linearly.

It is desirable to provide an efficient system and methods that allows a network device to efficiently configure routes for data streams.

SUMMARY

In one aspect, in at least one embodiment described herein, there is provided a data transmission system comprising a plurality of video routers, a supervisory system for transmitting one or more router configuration signals to one or more video routers, and a control communication network for coupling the plurality of video routers and the supervisory system. Each router in the system comprises a backplane including a plurality of backplane connections, at least one line card and at least one fabric card. Each line card comprises a plurality of input ports and output ports where each input and output port is coupled to a respective external signal through the backplane. Each line card further comprises a line card cross-point switch having a plurality of input switch terminals and a plurality of output switch terminals. Each fabric card comprises a fabric card cross-point switch having a plurality of input switch terminal and a plurality of output switch terminals. Furthermore, each line card and each fabric card comprises a card controller where the card controller selectively couples one or more input switch terminals of a cross-point switch to the output switch terminals of that cross-point switch. The cross-point switches being manipulated by the card controller may belong to one or more different cards within the same video router.

In some cases, the card controller of a first card in a first video router configures a corresponding cross-point switch of the first card to route a data stream from an input port to an output port, where the first card and the second card are a line card or a fabric card.

In some other cases, the card controller of a first card in a first video router configures a cross-point switch of a second card in the first video router to route a data stream from an input port to an output port, where the first card and the second card are a line card or a fabric card.

In various cases, where when a data stream is received at an input port of a first card, a first card controller corresponding to the first card is configured to transmit a data request to the supervisory system, where the supervisory system is configured to: determine an output destination identifying an output port, and generate one or more router configuration signals for one or more card controllers based on the output destination, wherein the one or more card controllers configure one or more cross-point switches to route the data stream to the output port.

In various cases, where when a data stream is received at an input port of a first card, a first card controller corresponding to the first card is configured to: determine an output destination identifying an output port, and transmit a data request to the supervisory system, where the supervisory system is configured to: generate one or more router configuration signals for one or more card controllers based on the output destination, wherein the one or more card controllers configure one or more cross-point switches to route the data stream to the output port.

In various cases, where if the data stream is designated a priority stream, at least one of the one or more card controllers reconfigures the corresponding cross-point switch to route the priority stream.

In various cases, where the backplane comprises a plurality of backplane connectors for receiving the at least one line card and the at least one fabric card.

In various cases, where each backplane connector comprises a plurality of backplane contacts, wherein each line card and each fabric card comprises a plurality of card pins, and wherein the plurality of backplane contacts and the plurality of card pins provide an electrical connection when coupled.

In various cases, the system further comprises a switch configuration database coupled to the controller communication network and configured to store coupling of the input switch terminals of at least one line card cross-point switch and the fabric card cross-point switch to corresponding output switch terminals.

In various cases, the switch configuration database is provided within the card controllers.

In another aspect, in at least one embodiment described herein, there is provided a method of routing video signals from a plurality of input ports to a plurality of output ports using at least one video router of a data transmission system disclosed herein. The method comprises receiving a data stream at an input port of a card, the card being a line card, receiving one or more router configuration signals by one or more card controllers, at least one card controller being a line card controller of the line card, and configuring one or more cross-point switches by card controllers based on the one or more router configuration signals to route the data stream between the input port and an output destination, wherein at least one of the one or more cross-point switches correspond to a cross-point switch of the line card.

In various embodiments, the method of routing video signals is configured to operate in accordance with the devices defined above or in accordance with the teachings herein.

In another aspect, in at least one embodiment described herein, there is provided a data transmission system comprising a control layer, a data layer and a controller communication network for coupling the control layer and the data layer. The control layer comprises a supervisory system configured to transmit one or more router configuration signals to one or more video routers, the one or more router configuration signals comprising instructions to selectively configure the one or more routers, and one or more card controllers provided in the one or more video routers, each card controller configured to selectively couple input switch terminals of one or more cross-point switches to output switch terminals of the corresponding one or more cross-point switches. The data layer comprises one or more cross-point switches, the one or more cross-point switches provided in the one or more video routers, each cross-point switch comprising a plurality of input switch terminals and a plurality of output switch terminals, a backplane including a plurality of backplane connections, wherein a subset of the plurality of input switch terminals and the output switch terminals are coupled to a respective plurality of backplane connections, a plurality of input ports and a plurality of output ports corresponding to each video router, where the supervisory system is configured to: receive a request signal from a card controller, and transmit a router configuration signal to one or more card controllers, the router configuration signal comprising instructions to selectively couple input switch terminals to output switch terminals of the one or more cross-point switches coupled to the one or more card controllers.

In various embodiments, the data transmission system is configured to operate in accordance with the devices and methods defined above or in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the applicant's teachings described herein, reference will now be made, by way of example only, to the accompanying drawings which show at least one exemplary embodiment, and in which.

Figure 1:
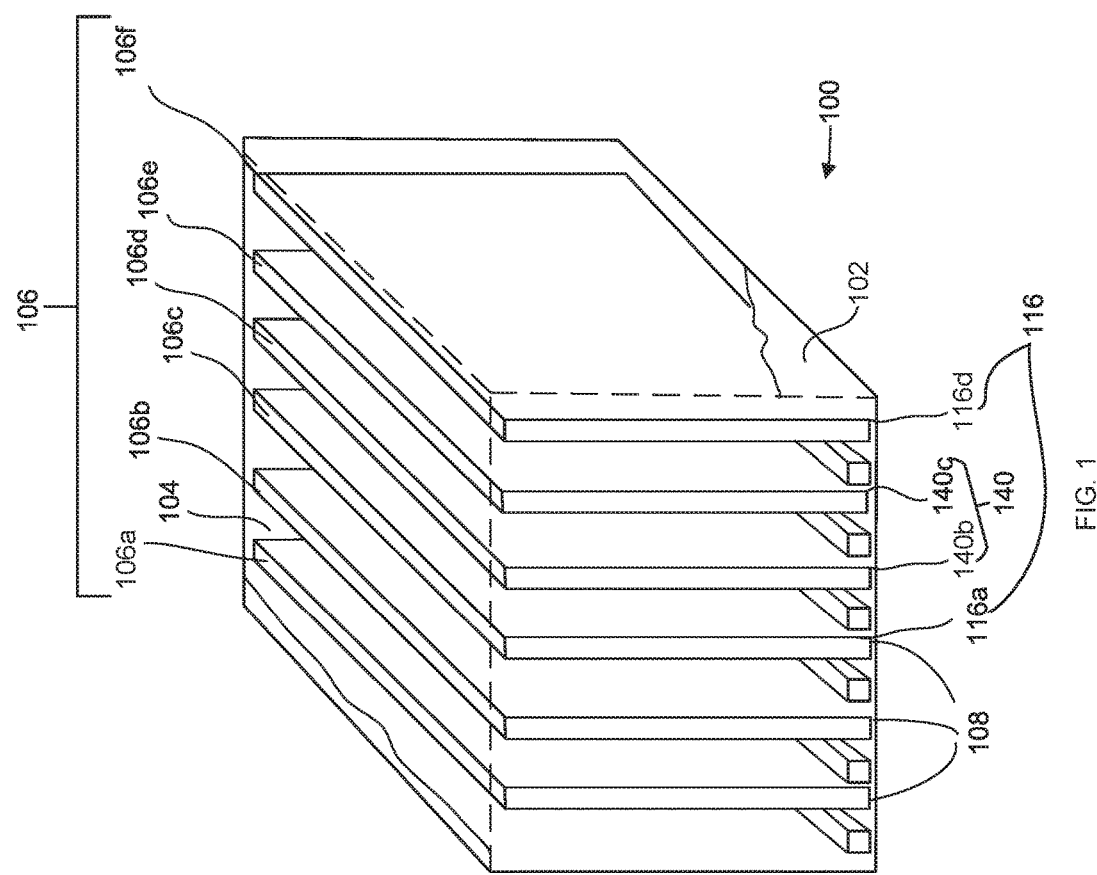
FIG. 1 is a cross-section of a video router according to an example embodiment.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

Figure 2:
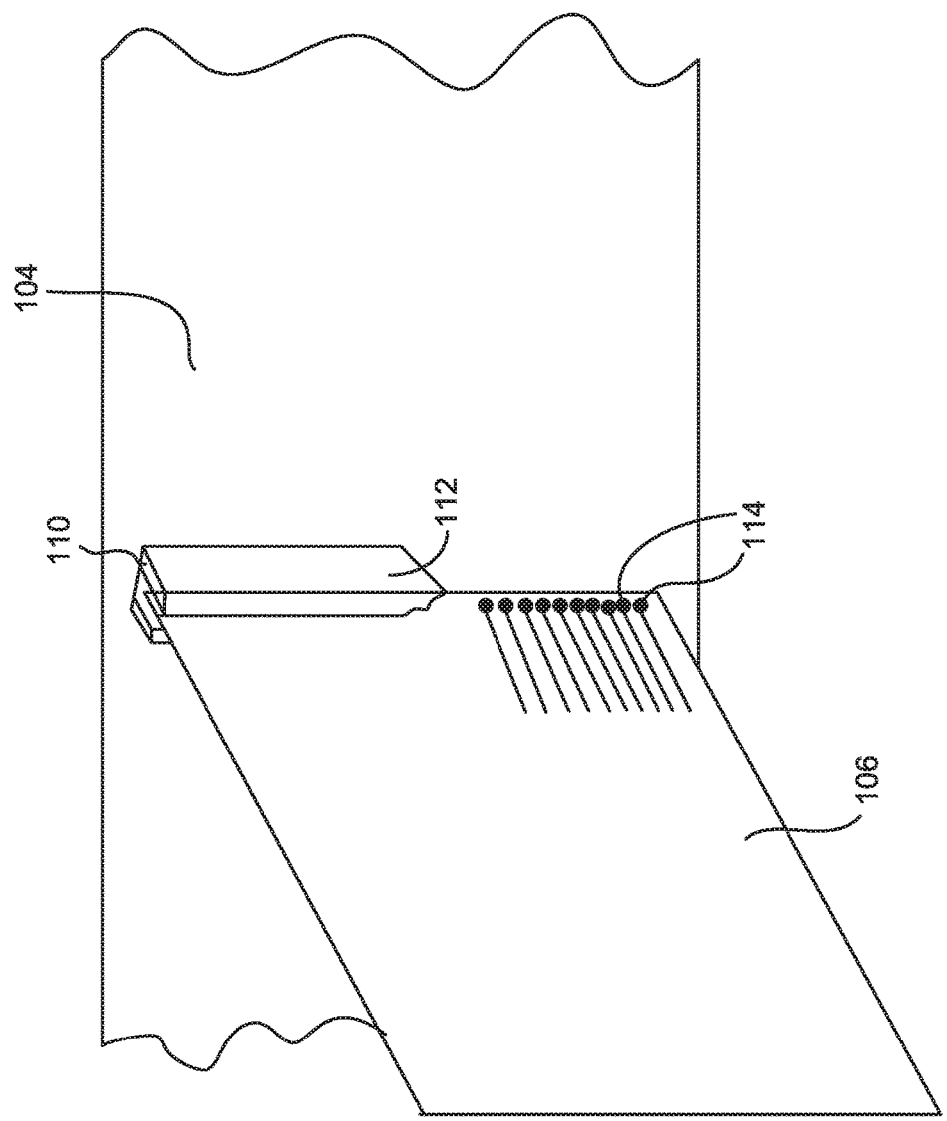
FIG. 2 is a cross-section of a video router according to another example embodiment.

Reference is first made to FIGS. 1 and 2, which illustrates a first video router 100 with an integrated control layer. Router 100 includes a frame or housing 102, a backplane 104 and a plurality of cards 106, such as a first card 106a, a second card 106b, a third card 106c, a fourth card 106d, a fifth card 106e and a sixth card 106f. The frame 102 includes a plurality of frame slots 108 in which cards may be received and held in place. The backplane 104 includes backplane connector 110 corresponding to each slot 108 and each card 106. Each backplane connector includes a plurality of backplane pins or contacts 112. Each card 106 includes a plurality of card pins or contacts 114, each of which corresponds to a backplane pin 112 of the corresponding backplane connector. When a card 106 is installed in frame 102, the card pins 114 couple with corresponding backplane pins 112 making an electrical connection through which a data signal may be transmitted.

Cards 106 may include various types of cards. For example, some of the cards may be line cards 116, such as a first line card 116a and a second line card 116d, which include input ports or output ports for respectively receiving and transmitting data signals, or both input and output ports. Other cards 106 may be fabric cards 140, such as a first fabric card 140b and a second fabric card 140c, which facilitate switching of signals between various input and port ports.

Figure 3:
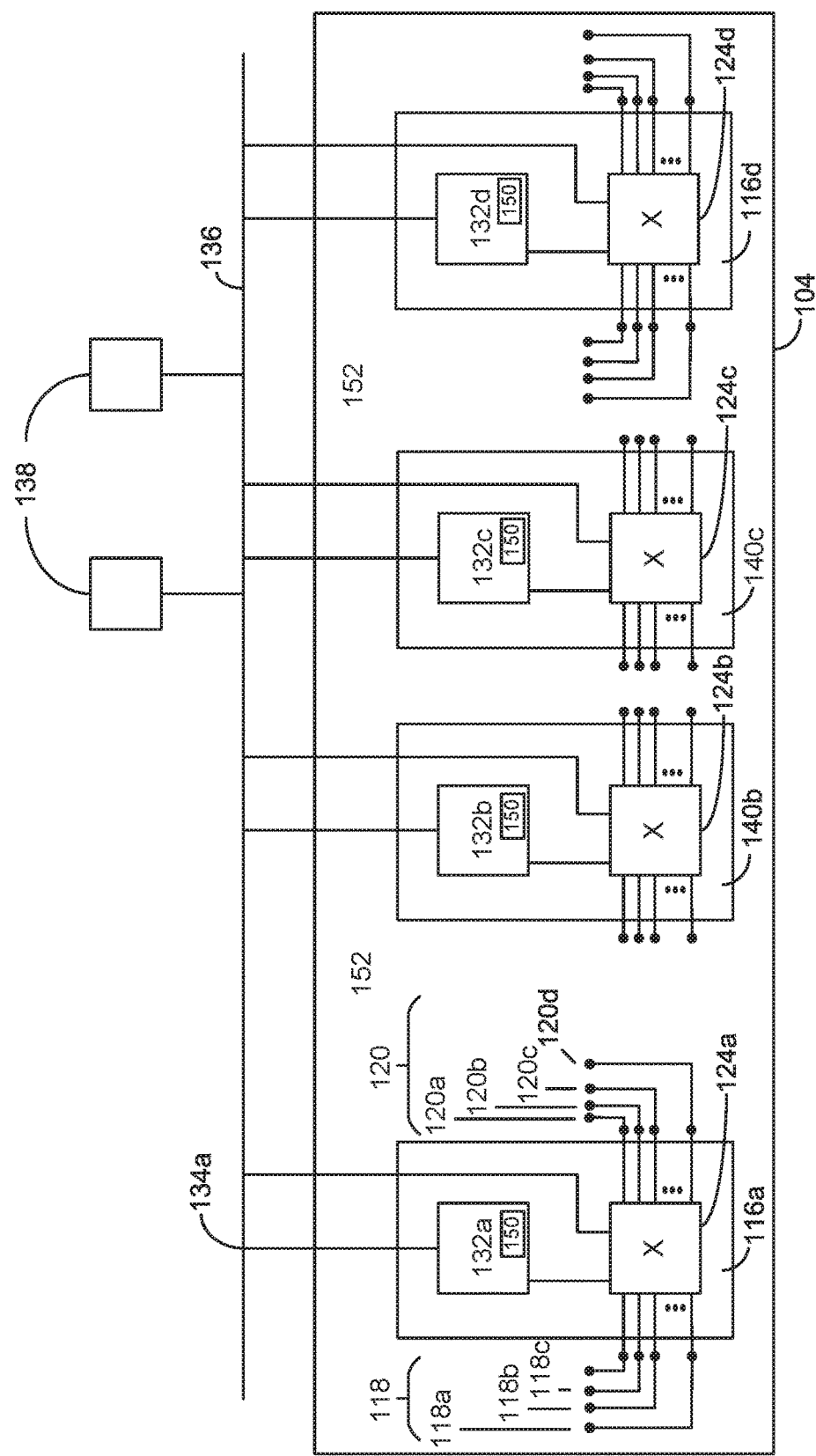
FIG. 3 is a block diagram of a video router according to an example embodiment.
Figure 4:
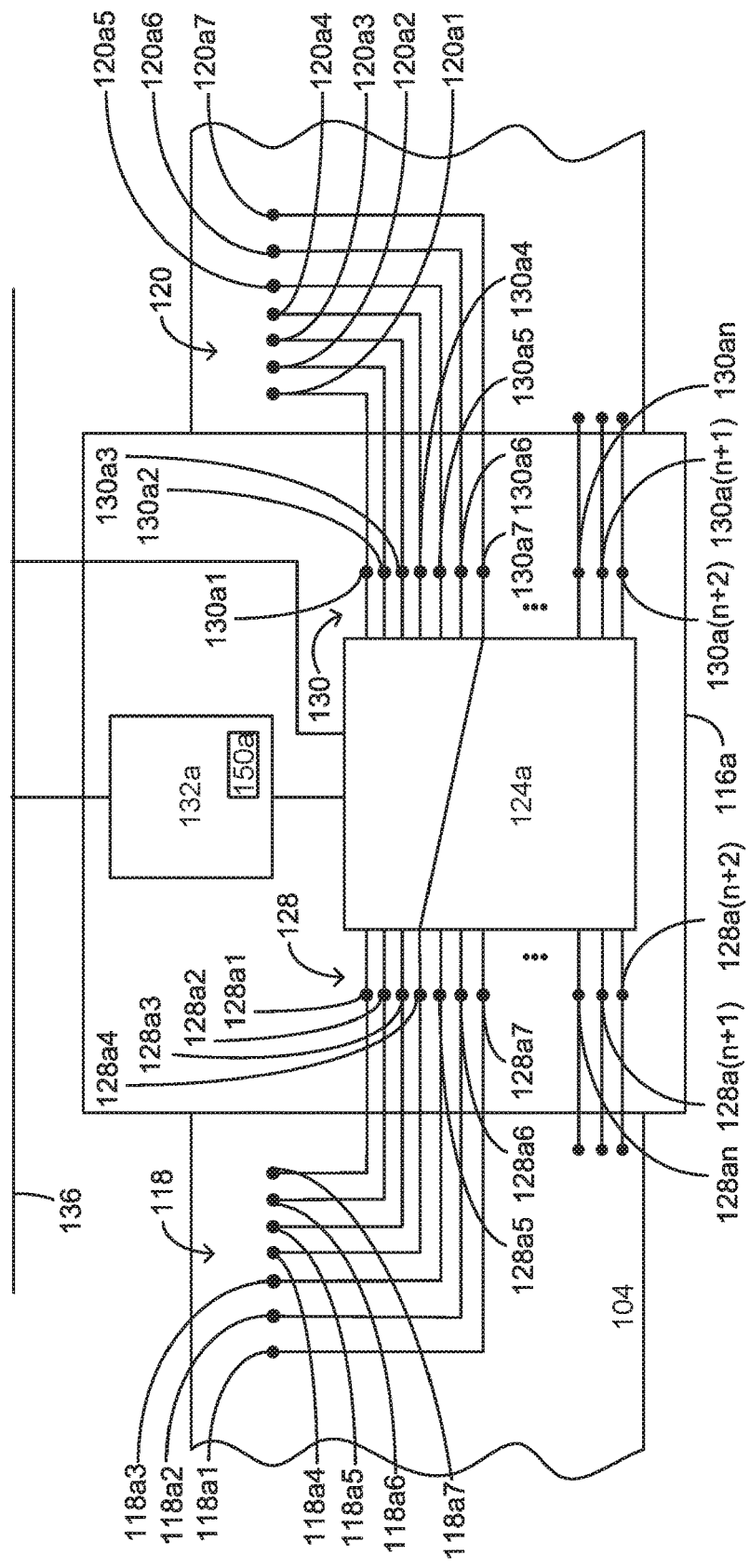
FIG. 4 is a block diagram of a video router according to another example embodiment.
Figure 5:
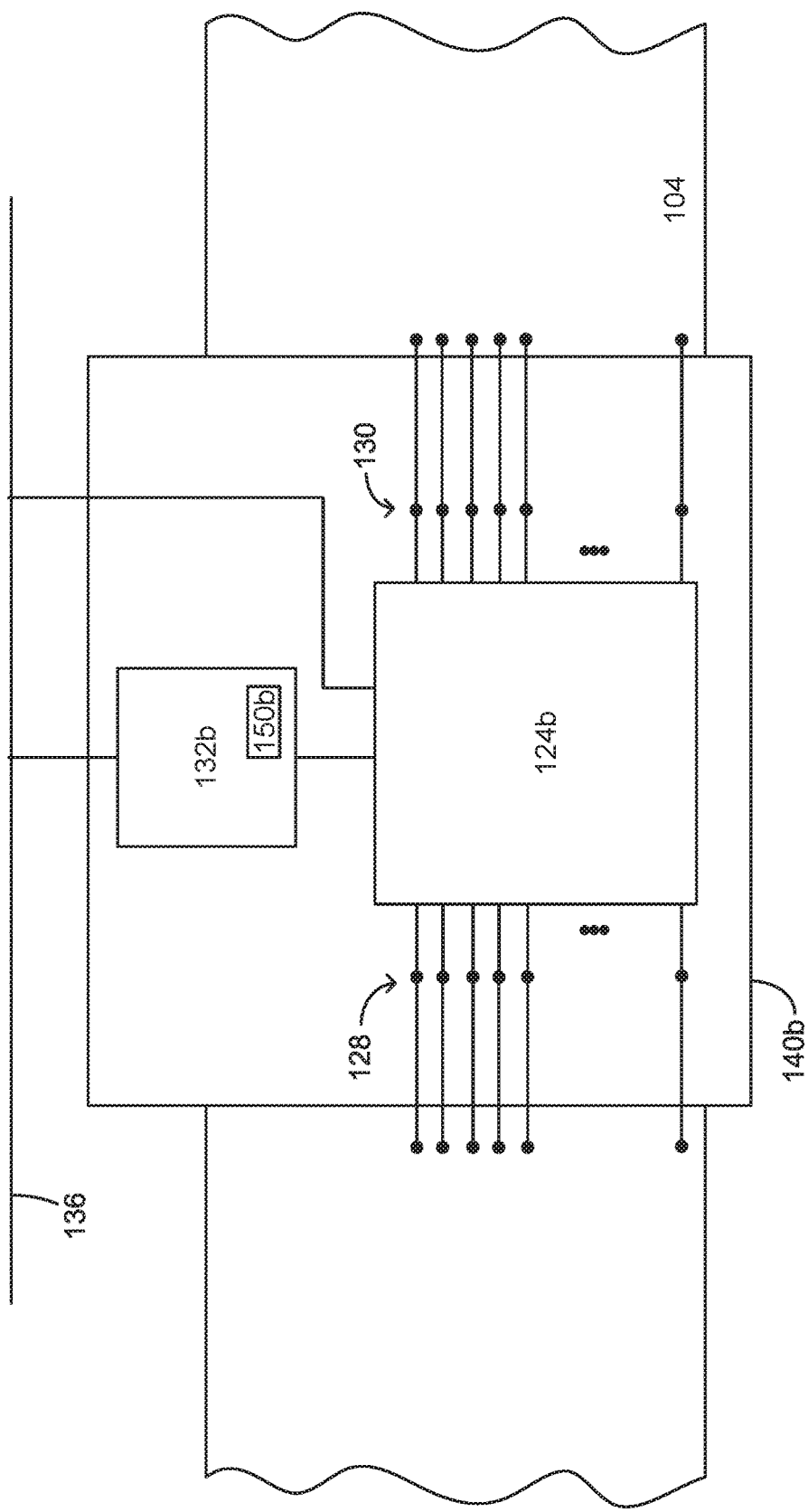
FIG. 5 is a block diagram of a video router according to another example embodiment.

Reference is made to FIGS. 3, 4 and 5, which schematically illustrate components of router 100. In the present example embodiment, each input port 118 or output port 120 on a line card 116a is coupled to an external signal through the backplane 104. In the illustrated embodiment of FIG. 3, input port 118 comprises a first input port 118a, a second input port 118b and a third input port 118c, and output port 120 comprises a first output port 120a, a second output port 120b, a third output port 120c and a fourth output port 120d. The backplane may, for example, include a pass-through connector to which a line card port 118, 120 may be coupled within frame 102 and to which a cable (not shown) may be coupled on the rear of the backplane. The line card port 118, 120 is electrically coupled to the cable (not shown), allowing the line card to receive or transmit a data signal on the cable. In other embodiments, line card ports may be directly coupled to a cable or may be coupled to a cable through the backplane using a coupling other than a pass-through connector.

Line card 116a includes a line card crosspoint switch 124a with a plurality of switch terminals. In this example, crosspoint switch 124a has a plurality of input switch terminals 128 and a plurality of output switch terminals 130. Each input port 118 is coupled to at least one input switch terminal 128 and each output port 120 is coupled to at least one output switch terminal 130. In addition, a plurality of input switch terminals 128 are coupled to the backplane 104 through the corresponding backplane connector 110. A plurality of output switch terminals 130 are coupled to the backplane 104 through the corresponding backplane connector 110.

Line card 116a also includes a line card controller 132a that is coupled to crosspoint switch 124a and which provides control signals to couple or decouple particular input switch terminals 128 to particular output switch terminals 130. Card controller 132a is coupled to a controller communication network 136 at a control system terminal 134a through which the card controller 132a may communicate with other cards 106 and with external control devices such as an external supervisor 138. In some embodiments, a line card controller 132a may be coupled to controller communication network 136 through the backplane or through another communication bus in frame 102 to which the line card is couple when installed in the frame.

Each fabric card, such as fabric card 140b includes a card controller 132b and a crosspoint switch 124b, which are coupled together and operate in a manner similar to the card controller 132a and crosspoint switch 124a of line card 116a. Crosspoint switch 124b includes a plurality of input switch terminals 128 and output switch terminals 130 that are coupled to the backplane 104. The crosspoint switch 124b may be configured to couple any of the input switch terminals 128 to any of the output switch terminals 130 under the control of card controller 132b. As illustrated in FIG. 3, router 100 further includes a fabric card 140c, which includes a card controller 132c and a crosspoint switch 124c, and a line card 116d, which includes a card controller 132d and a crosspoint switch 124d.

Each crosspoint switch 124a, 124b, 124c, 124d in router 100 is coupled to the controller communication network 136 through which the configuration of the crosspoint switch 124a, 124b, 124c, 124d may be changed by card controller 132a, 132b, 132c, 132d on other cards 106.

Router 100 also includes a switch configuration table or database 150. Database 150 records the current setting for every input switch terminal and output switch terminal in all cross-point switches 124a, 124b, 124c, 124d in the router 100. For example, part of the contents of database 150 may be:

| Switch | Terminal | Setting |
|--------|----------|---------|
| 124a | 128a1 | Coupled to 130c3 |
| 124a | 128a2 | Coupled to 130a27 |
| 124a | 128a3 | Open |
| 124a | 128a4 | Coupled to 130a8 |
| ... | ... | ... |
| 124a | 130a3 | Coupled to 128a1 |
| 124a | 130a4 | Open |
| 124a | 130a5 | Coupled to 128a2 |
| 124a | 130a6 | Open |
| 124a | 130a7 | Coupled to 128a2 |
| 124b | 130a8 | Coupled to 128a4 |
| ... | ... | ... |
| 124b | 128b1 | Open |
| ... | ... | ... |
| 124c | 128c35 | Coupled to 130c14 |
| ... | ... | ... |
| 124c | 130c14 | Coupled to 128c35 |
| ... | ... | ... |
| 124d | 128d12 | Coupled to 130d5 |
| 124d | 130d5 | Coupled to 128d12 |
| ... | ... | ... | where router 100 of FIG. 4 comprises a first input port 118a1, a second input port 118a2, a third input port 118a3, a fourth input port 118a4, a fifth input port 118a5, a sixth input port 118a6, a seventh input port 118a7, a first output port 120a1, a second output port 120a2, a third output port 120a3, a fourth output port 120a4, a fifth output port 120a5, a sixth output port 120a6, a seventh output port 120a7, a first input switch terminal 128a1, a second input switch terminal 128a2, a third input switch terminal 128a3, a fourth input switch terminal 128a4, a fifth input switch terminal 128a5, a sixth input switch terminal 128a6, a seventh input switch terminal 128a7, an nth input switch terminal 128an, a (n+1)th input switch terminal 128a(n+1), a (n+2)th input switch terminal 128a(n+2), a first output switch terminal 130a1, a second output switch terminal 130a2, a third output switch terminal 130a3, a fourth output switch terminal 130a4, a fifth output switch terminal 130a5, a sixth output switch terminal 130a6, a seventh output switch terminal 130a7, an nth output switch terminal 130an, a (n+1)th output switch terminal 130a(n+1) and a (n+2)th output switch terminal 130a(n+2).

Database 150 is accessible to each of the controllers 132a, 132b, 132c, 132d. In some embodiments, the database 150 may be recorded in a central location, for example, in one of the controllers 132a, 132b, 132c, 132d where the local controller 132a, 132b, 132c, 132d may access the database directly and each of the other controllers may access the database through the controller communication network 136.

In other embodiments, the database may be a distributed database with components that are located in multiple locations within router 100. For example, components of database 150a, 150b may be located in each of the controllers 132a, 132b, as is illustrated in FIGS. 4 and 5. Each controller 132a, 132b may contain the status of the cross-point switch 124a, 124b in the same card 106. Controllers 132a, 132b, 132c, 132d on other cards 106 may access the status of non-local cross-points switches through the controller communication network 136.

In other embodiments, the database may be recorded in a data storage device or system that is external to router 100, but which is accessible to the controller 132a, 132b, 132c, 132d.

In still other embodiments, a copy of the entire database 150 may be maintained at each controller 132a, 132b, 132c, 132d. A synchronization system that locks some or all of each copy of the database may be used to ensure that all copies of the database 150 are maintained in synchronization. In such embodiments, each controller 132a, 132b, 132c, 132d may use only its local copy of the entire database 150.

In various embodiments, a combination of these techniques may be used to maintain database 150.

As illustrated in FIG. 5, the backplane 104 includes a plurality of static point-to-point backplane connections 152 that couple output switch terminals on one card 106 to input switch terminals on another card 106. For example, backplane connections may couple output switch terminal 130a27 on line card 116a to input switch terminal 128c35 on fabric card 140c. Various embodiments may include as many or as few backplane connections between output switch terminals to input switch terminals.

In any particular embodiment, the sizes of the various crosspoint switches 124a, 124b, 124c, 124d and the number of backplane connections can be selected to provide a desired level of functionality in the router. For example, in a router designed for a specific purpose, for example, in which only a limited number of couplings between input ports 118 and output ports 120 may be required, may have a correspondingly limited number of backplane connections 152. Fabric cards are typically useful to increase the flexibility with which a particular input port can be coupled to a particular output port. In some embodiments, all cards 106 may be line cards with no fabric cards.

By selectively configuring one or more crosspoint switches 124a, 124b, 124c, 124d, a particular input port 118 on one line card 116 may be coupled to a particular output port 120 on the same or another line card.

Reference is made to FIG. 4. For example, if:
input port 118a4 is fixedly coupled to input switch terminal 128a4;
switch crosspoint switch 124a couples input switch terminal 128a4 to output switch terminal 130a7; and
output switch terminal 130a7 is fixedly coupled to output port 120a7, then an input data signal received input port 118a4 on line card 116a will be coupled to output port 120a7.

Figure 6:
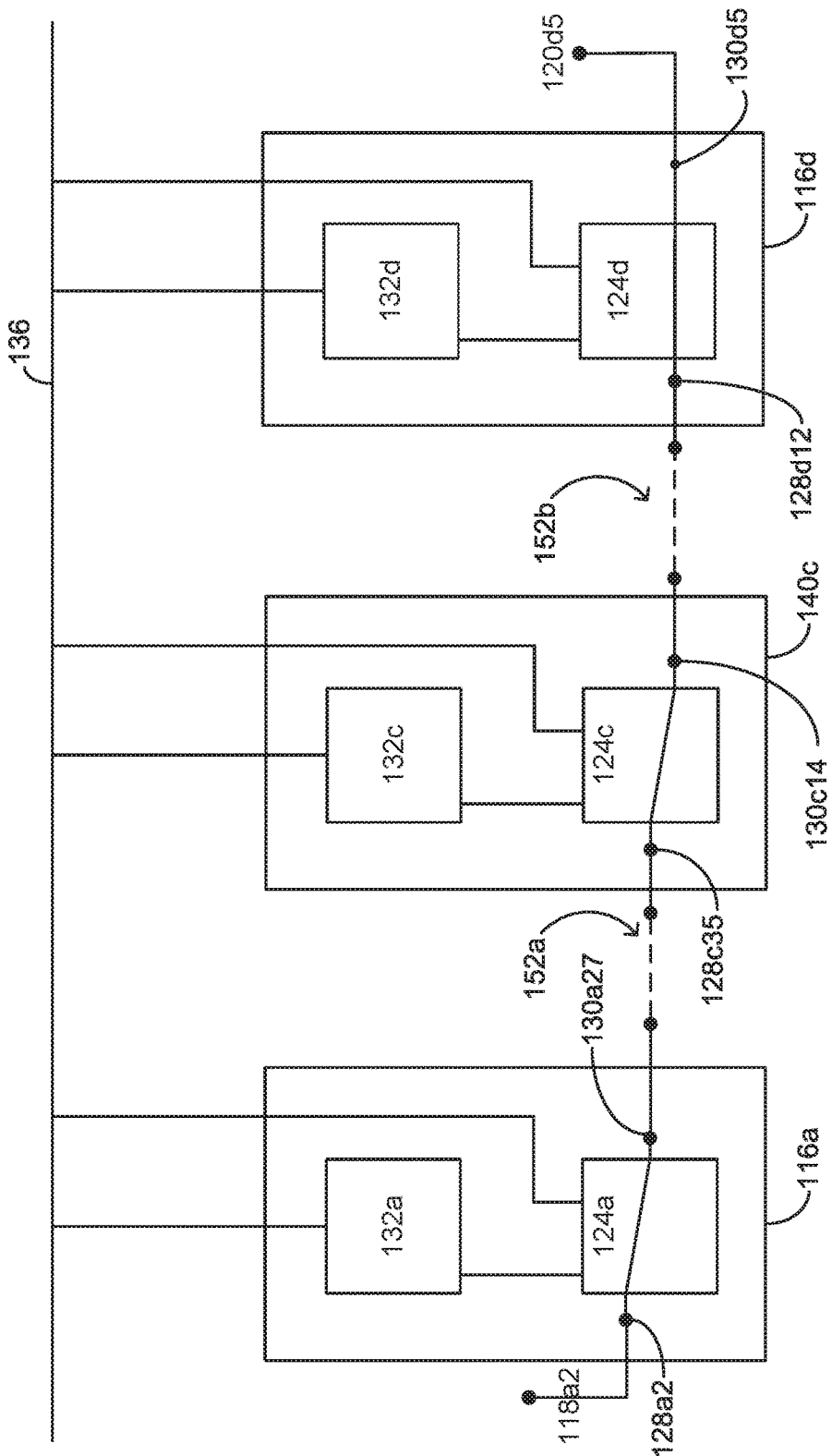
FIG. 6 is a block diagram of a video router according to another example embodiment.

Reference is made to FIG. 6. If:
input port 118a2 is fixedly coupled to switch input terminal 128a2;
switch input terminal 128a2 is coupled to output switch terminal 130a27 in crosspoint switch 124a;
output switch terminal 130a27 is coupled to input switch terminal 128c35 in fabric card 140c through backplane connection 152a;
switch input terminal 128c35 is coupled to output switch terminal 130c14 in crosspoint switch 124c;
output switch terminal 130c14 is coupled to input switch terminal 128d12 through the backplane connection 152b;
switch input terminal 128d12 is coupled to output switch terminal 130d5 in crosspoint switch 124d; and
output switch terminal 130d5 is fixedly coupled to output port 120d5, then an input data signal received at input port 118a2 on line card 116a will be coupled to output port 120d5 on line card 116d.

In router 100, each controller 132a, 132b, 132c, 132d is coupled to each crosspoint switch 124a, 124b, 124c, 124d in the router and may instruct any crosspoint switch 124a, 124b, 124c, 124d to couple specific input switch terminals and output switch terminals within the crosspoint switch 124a, 124b, 124c, 124d. Through one or more steps through crosspoint switches and through backplane connection 152, an input signal received at an input port 118 may be coupled to an output port 120 on the same or a different line card. In some embodiments, the crosspoint switches and the number of pairs of output switch terminals and input switch terminals coupled by backplane connections 152 may be sufficient to allow any input port 118 to be coupled to any output port 120, possibly through a variety of different routes.

A particular controller 132a, 132d in a line card 116a, 116d may be configured to ensure that a data signal or data stream received at the line card is routed through to an appropriate destination for the data stream. For example, when a data stream is initially received at an input port 118, the controller examines the packets in the data stream, which will identify a destination for the data stream. The controller then determines which output port 120 in the router (which may be on the same line card as the controller or on another line card) is coupled to the destination. The controller then determines a path through the router and configures one or more crosspoint switches to provide the path between the input port 118 and the output port 120. The controller will typically select a route based on router configuration data that is previously recorded in the controller. The router configuration data includes information about the availability of backplane connections between different cards and may include additional information about the router structure or configuration. The controller will also typically consider the contents of the database 150. Typically a controller will not change the configuration of an input switch terminal or an output switch terminal that is already in use (i.e. coupled to a corresponding switch terminal). In some embodiments, a priority level for some or all of the couplings between different pairs of input switch terminal and output switch terminal may be maintained in database 150. A controller may determine a priority level for a data stream that the controller is routing through router 100. If an input switch or an output switch terminal is in use, but the stored priority level for the stream being routed through the switch is lower than the priority of the stream that the controller is attempting to route, then the control may change the configuration of the switch to use it for the higher priority data stream. In some cases, the router may have multiple paths through which a data stream can be routed from a particular input port 118 to a particular output port 120 and it may be possible to provide a needed routing for a high priority data stream without disrupting a lower priority data stream. Each controller may be configured to identify multiple routings to reduce disruption to existing routes set up within the router.

In some conditions, a controller may not be able to determine a route by which a data stream can be delivered to a particular output port 120. In such conditions, the controller 132 may send a routing request to a supervisor 138 through the controller communication network 136. A supervisor will typically be an external device that can monitor and control the configuration of crosspoint switches 124a, 124b, 124c, 124d in the router 100 and possibly in other routers. In some embodiments, a supervisor 138 may be built into a router. In some embodiments, duplicate or multiple supervisors may be provided to provide redundancy or improved responsiveness when a request is sent to a supervisor or a group of supervisors.

Each time a controller 132a, 132b, 132c, 132d changes the configuration of a switch 124a, 124b, 124c, 124d, the changes are recorded in the database 150.

A supervisor may receive various types of requests. For example, a controller may ask a supervisor to provide a route from a particular input port to a particular output port. A controller may ask a supervisor to examine a packet to determine the output port to which the packet (and the corresponding data stream) should be coupled, and possibly also to provide a routing between the input port on which the data stream is received and the output port.

In some embodiments, a supervisor may directly change the configuration of crosspoint switches 124a, 124b, 124c, 124d and update database 150 and advise the requesting controller that the request has been satisfied and optionally provide details of configuration changes made in the router. In other embodiments, a supervisor may provide a response to a controller making a request and the controller may then implement the details of the response.

In some embodiments, each controller 132a, 132b, 132c, 132d may record some or all of the routes that are used by the controller, including some or all of the requests provided by a supervisor. The controller 132a, 132b, 132c, 132d may subsequently refer to the recorded requests to select routes for data streams between input ports 118 and output ports 120 based on the previously recorded routes. In some embodiments, the controller may track performance information such as the frequency with which transmission failures occur in particular routes and may select more reliable routes. Over time, the recorded route may become a library allowing a controller 132a, 132b, 132c, 132d to resolve an increasing number of routing requirement without sending a request to a supervisor. In addition, some or all of the controllers may be configured to find routes without reference to previously recorded route or making a request to a supervisor.

In this manner, the controllers 132*a*, 132*b*, 132*c*, 132*d* in each card 106 are able to provide routes for data streams through the router 100. Some of the routes may traverse only the line card on which a data stream is received while other routes may traverse various line cards, fabric cards and backplane connections. In doing so, the controller can reduce the number of requests transmitted to the supervisor, increasing the rate at which data streams can be coupled through a router, particularly when a router receives, routes and transmits a large number of data streams.

Router 100 has been described as a video router. A video router will typically receive audio/video data streams (which may be referred to as transport streams). In some embodiments, the data streams may also include non-video streams or may not include any video streams at all.

Figure 7:
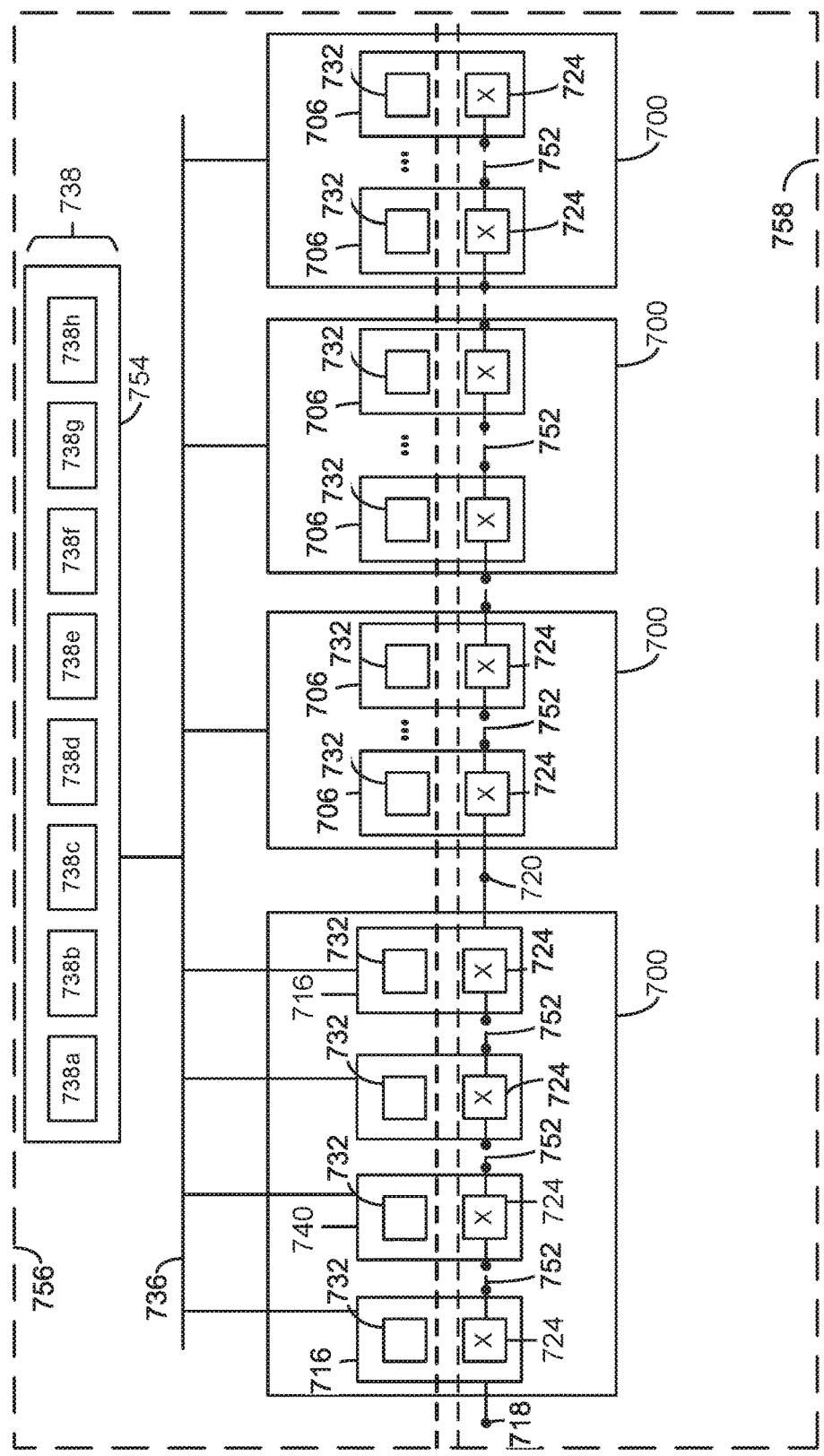
FIG. 7 is a block diagram of a control hierarchy of a video router according to an example embodiment.

Reference is next made to FIG. 7, which illustrates a control hierarchy between the card controllers, supervisors, other routers and other devices in a system. In some situations, a plurality of routers 700 may be coupled to provide a data transmission system. For example, routers 700 may be installed in a video processing facility such as a television studio or broadcast facility. Some or all of the routers may receive and transmit a plurality of input and output data streams. In some facilities, hundreds, thousands or even millions of data streams may be received and transmitted. The group of routers will typically be interconnected with a variety of other equipment including signal processors, analytic devices and other devices that generate or require data streams that are switched through one or more routers.

Each router 700 is coupled to a supervisor system 754, which may include a plurality of supervisors 738, such as a first supervisor sub-system 738*a*, a second supervisor sub-system 738*b*, a third supervisor sub-system 738*c*, a fourth supervisor sub-system 738*d*, a fifth supervisor sub-system 738*e*, a sixth supervisor sub-system 738*f*, a seventh supervisor sub-system 738*g* and an eighth supervisor sub-system 738*h*. The supervisor system 754 forms a hierarchy in conjunction with the controllers 732 in each router. As described above, a card controller 732 on a card 706, including a line card 716 and a fabric card 740, in a router 700 may control the configuration of the corresponding switch 724 on its card 706 and may also be authorized to control the configuration of switches 724 on other cards within the same router. The controller may send requests to a corresponding supervisor sub-system 738*a* when the controller is unable to determine a route for a data stream, for example, when the controller is unable to allocate switches or connections to set up a required route, or when a route may require coordination between routers or under other conditions, which may include instructions from a supervisor to always make a request to the supervisor when certain types of data streams are received or after a particular time or other conditions. In some cases, two or more supervisors may be assigned to each router and may act as primary and backup routers, may operate in parallel, or may operate in a distributed manner to manage the flow and latency or requests made to the supervisory system 754.

The supervisory system 754 may itself be coupled to other devices in a facility via a controller communication network 736 to receive and provide control and status information about the routers 700. Such control and status information may be used to control the routing of data streams within and between routers 700. For example, the other devices in the facility may identify high priority data streams that are to be switched through one or more routers 700 to reach a particular destination. Supervisor system 754 may instruct one or more of the routers to configure an appropriate route between a port on which a high priority data stream is to be received and its destination. In such a situation, a supervisor sub-system 738 may instruct the routers to configure a route directly, without previously having received a request from a controller 732.

FIG. 7 illustrates a control hierarchy in which the supervisory system 754 communicates with other devices, which may be at the same or a different facility as the supervisory system. Supervisors 738 in the supervisor system 754 control the routing of data streams within and between the routers and between the routers and other devices. Controllers 732 in the routers can control routes directly within the router and may request control instructions from supervisors to generate requests. The supervisory system 754 and the controllers 732 are part of a control layer 756 that provides routes for data streams.

FIG. 7 also illustrates a data layer 758 in which the data streams are transmitted. The data layer 758 includes input ports 718, switches 724, backplane connections 752 and output ports 720. The control layer 756 configures the data layer so that data streams are able to traverse the data layer between input ports and output ports.

The present invention has been described here by way of example only. Various modification and variations may be made to these exemplary embodiments without departing from the scope of the invention, which is limited only by the appended claims.

The invention claimed is:

1. A priority based transmission system comprising:
a plurality of data signals;
a plurality of video routers;
a supervisory system configured to transmit one or more router configuration signals to one or more video routers, the one or more router configuration signals comprising a data signal path;
a controller communication network for coupling the plurality of video routers and the supervisory system;
wherein, each video router comprises:
a backplane including a plurality of backplane connections,
at least one line card, the line card comprising:
a plurality of input ports and output ports, each input port and output port being coupled to a respective data signal through the backplane, and
a line card cross-point switch having a plurality of input switch terminals and a plurality of output switch terminals, wherein a first plurality of input and output switch terminals are coupled to a respective plurality of input and output ports and a second plurality of input and output switch terminals are coupled to a respective plurality of backplane connections, and
at least one fabric card, each fabric card comprising: a fabric card cross-point switch having a plurality of input switch terminals and a plurality of output switch terminals, wherein the plurality of input and output switch terminals are coupled to a respective plurality of backplane connections,
wherein the data signal path comprises an input switch terminal, one or more cross-point switches from one or more video routers, and an output switch terminal, and
wherein, each line card and fabric card comprises a card controller, the card controller being coupled to one or more cross-point switches and configured to determine the path of one or more data signals based on the router configuration signals.

2. The system of claim 1 wherein a first path and a second path are determined based on a first priority and a second priority, the first path corresponding to a first data signal and the second path corresponding to a second data signal.

3. The system of claim 2 wherein the first priority and the second priority are equal.

4. The system of claim 2 wherein the first priority is higher than the second priority and the first path replaces at least a portion of the second path.

5. The system of claim 2 wherein the first priority is higher than the second priority.

6. The system of claim 3 wherein the first path is determined based on an availability of backplane connections.

7. The system of claim 3 wherein the card controller determines a selected routing from at least two proposed routings, each proposed routing comprising a first proposed route and a second proposed route, the first proposed route corresponding to the first data signal and the second proposed route corresponding to the second data signal.

8. The system of claim 7 wherein the determining the selected routing from at least two proposed routings further comprises determining a selected routing based on a priority score.

9. The system of claim 7 wherein the determining the selected routing from at least two proposed routings further comprises determining a selected routing based on a historical measurement of a property of the first path.

10. The system of claim 9 wherein the historical measurement of a property of the first path comprises a previously measured frequency of transmission failures of the first path.

11. A method of priority based routing of video signals from a plurality of input ports to a plurality of output ports using at least one video router of the data transmission system of claim 1, the method comprising:
  receiving a data stream at an input port of a card, the card being a line card;
  receiving one or more router configuration signals by one or more card controllers, at least one card controller being a line card controller of the line card; and
  configuring one or more cross-point switches by card controllers to determine the path of one or more data signals based on the one or more router configuration signals.

12. The method of claim 11 further comprising determining a first path and a second path based on a first priority and a second priority, the first path corresponding to a first data signal and the second path corresponding to a second data signal.

13. The method of claim 12 wherein the first priority and the second priority are equal.

14. The method of claim 12 wherein the first priority is higher than the second priority and the first path replaces at least a portion of the second path.

15. The method of claim 12 wherein the first priority is higher than the second priority.

16. The method of claim 12 wherein the determination of the first path is based on an availability of backplane connections.

17. The method of claim 12 wherein the determination by the card controller of a selected routing from at least two proposed routings, each proposed routing comprising a first proposed route and a second proposed route, the first proposed route corresponding to the first data signal and the second proposed route corresponding to the second data signal.

18. The method of claim 17 wherein the determining the selected routing from at least two proposed routings further comprises determining a selected routing based on a priority score, the priority score determined from.

19. The method of claim 17 wherein the determining the selected routing from at least two proposed routings further comprises determining a selected routing based on a historical measurement of a property of the first path.

20. The method of claim 19 wherein the historical measurement of a property of the first path comprises a previously measured frequency of transmission failures of the first path.

* * * * *